Patented May 1, 1945

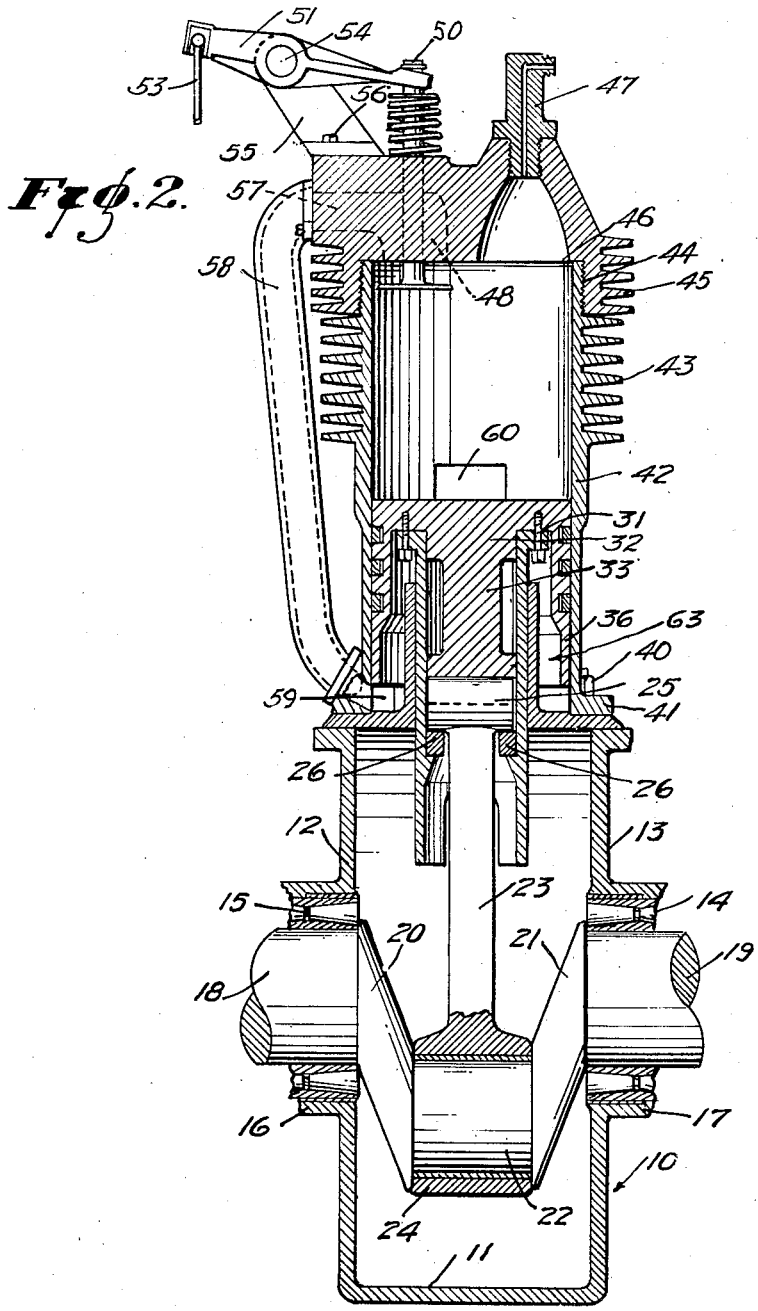

2,374,773

UNITED STATES PATENT OFFICE 2,374,773

INTERNAL-COMBUSTION ENGINE

Enock Norrbom, Los Angeles, Calif.

Application September 6, 1943, Serial No. 501,438

6 Claims. (Cl. 123—74)

This invention relates to internal combustion engines of the Diesel type, and particularly pertains to an internal combustion engine.

In the construction and operation of Diesel type engines it is common practice to provide a cylinder within which a piston reciprocates and into which cylinder fuel oil is injected, the ignition of the fuel charge being brought about by the rise in temperature produced by the compression of the charge as the piston moves toward the cylinder head. Such engines are also provided with a cylinder exhaust port which is valve controlled and which operates in synchronism with the engine crank shaft. It is obvious that in the performance of this type of engine the engine parts become excessively heated, so that there is a tendency for the firing period to advance with relation to the piston stroke and thus prevent efficient operation of the engine. It is desirable to provide means whereby the engine may be maintained at a lower temperature than is ordinarily the case, and that a suitable amount of fresh cool air shall be drawn into the combustion chamber of the cylinder after each firing stroke. It is the principal object of the present invention, therefore, to provide an engine of the Diesel type having a cylinder and a piston operating therein, the piston being so mounted as to insure that the engine will operate on the two-cycle principle, and that air will be drawn into the engine cylinder and will be compressed and delivered to the compression chamber with the fuel preparatory to combustion of fuel delivered by the nozzle.

It is a further object of the present invention to provide an engine structure of the type specified in which the compression of air takes place on the firing stroke of the piston, the structure being so designed as to insure that a relatively short engine cylinder is required, and that a suitable guide for the piston is provided which eliminates the necessity of obtaining crank case compression.

The present invention contemplates the provision of an engine cylinder having a cylinder head at its opposite ends, the outer head carrying an intake valve structure and the injector nozzle, and the inner head being formed with a bearing to receive a piston sleeve operatively connected to the crank shaft at one end and carrying a piston at its opposite end.

The invention is illustrated by way of example in the accompanying drawings in which:

Fig. 2 is a view in central vertical section through the engine as seen on a plane at right angles to that of the section shown in Fig. 1, and indicates the piston at the limit of its downstroke, and further discloses the connection between the cylinder beneath the piston and the air intake manifold.

Figure 1:
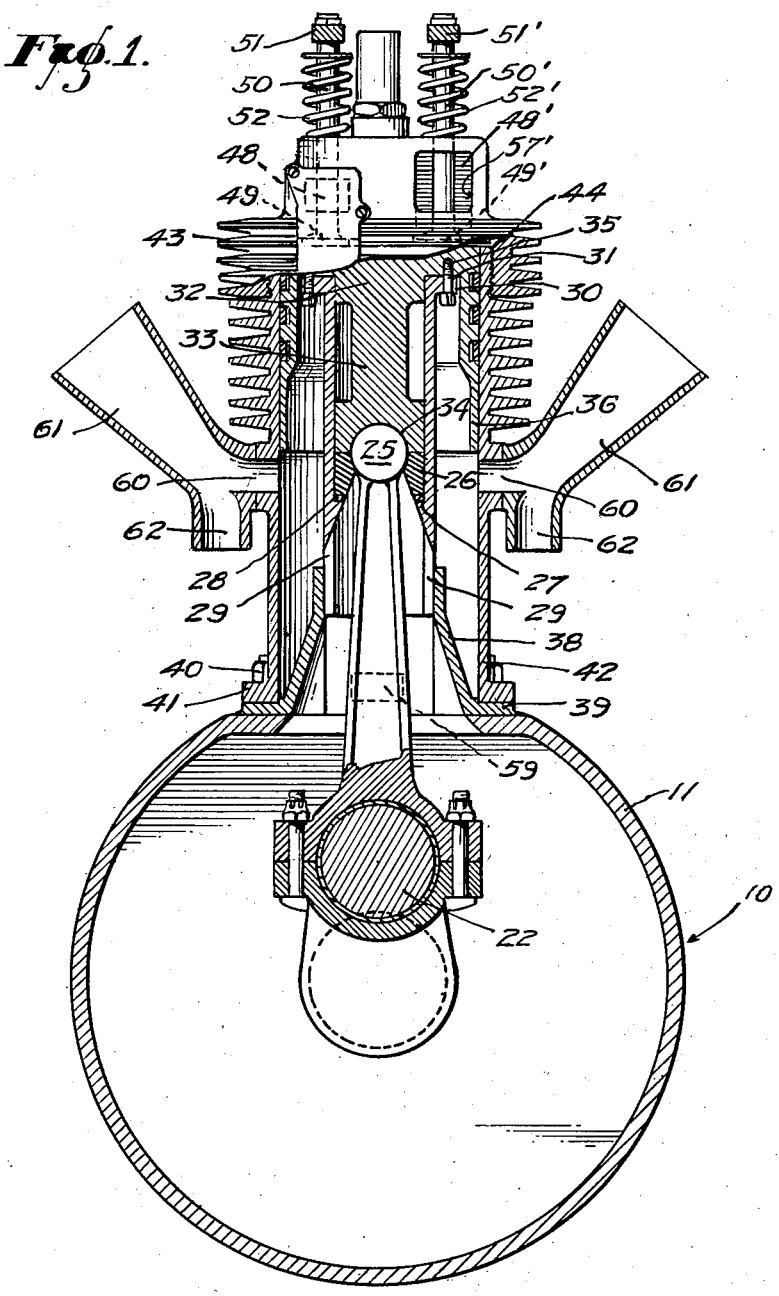
Figure 1 is a view in vertical section and elevation showing the piston at the limit of its up-stroke and indicating the air inlet port structures.

Referring more particularly to the drawings, 10 indicates a crank-case having the usual cylindrical side wall 11 and opposite end walls 12 and 13. The end walls are formed with bearings 14 and 15 which are here shown as receiving anti-friction bearings 16 and 17. Rotatably supported within the bearings 16 and 17 are the opposite end portions 18 and 19 of an engine crank shaft. The shaft is here shown as fitted with crank arms 20 and 21 between which the crank pin 22 occurs. It is to be understood that while the engine is shown as having only one cylinder that any number of cylinders may be used arranged along the crank shaft or disposed radially therearound. A connecting rod 23 is provided and also an outer bearing portion 24 which embraces the crank pin 22. The opposite end of the piston rod is formed with a T-head 25 which stands transversely of the member 23 and is cylindrical in shape. The axis of the head 25 is parallel to that of the crank pin 22. The T-head overhangs the opposite sides of the connecting rod 23 and rests upon bearing blocks 26. These blocks are mounted within a tubular cylindrical sleeve 27 and rest upon the shoulder 28 within the sleeve. The sleeve has a skirt which extends downwardly over the piston rod and is cut away at opposite sides, as indicated at 29 to accommodate the connecting rod 23. The upper end of the sleeve is formed with an annular out-turned flange 30 having an upper face resting against the face 31 of a cylindrical counterbore within a piston 32. The piston has a downwardly extending central portion 33 which has an arcuate bearing surface 34 which conforms to the upper half of the cross pin 25 of the piston rod. Cap screws 35 hold the sleeve and piston in their assembled relation to each other. The piston has the usual side wall 36 which is of an inside diameter substantially greater than the outside diameter of the sleeve 27. This accommodates an upwardly projecting tubular guide 38 within which the piston sleeve 27 reciprocates. The lower end of the guide 38 is formed with an annular flange which provides a lower cylinder head 39. The member 39 rests upon a flange at the top of the crank case 10 and is held by bolts or cap screws 40.

Resting upon the head portion 39 is a flange 41 of an engine cylinder 42. This cylinder is here shown as being formed along its upper portion with a plurality of spaced cooling fins 43. The outer end of the cylinder is externally threaded at 44 to receive a cylinder head 45. It will also be understood that if desired the cylinder head 45 may be secured in place with bolts or cap screws according to conventional design. A fuel chamber 46 is formed in the cylinder head and receives an injector nozzle 47 which is connected with the fuel pump mechanism, as usually provided with Diesel engines. The cylinder head is also formed with a pair of air inlet chambers 48 and 48' which may each be closed by valves 49 and 49', respectively. The valves 49 and 49' are of the tappet type and are fitted with stems 50 and 50', respectively, extending upwardly through suitable bearings and engaged by rocker arms 51 and 51'. Valve springs 52 act to move the valves 49 and 49' toward their closed positions. The outer ends of the rocker arms are connected with pitman rods 53 which in turn are operatively connected to a valve timing mechanism, the details of which are not shown in the drawings. The rocker arms 51 and 51' are mounted upon a rocker shaft 54 carried by bearing brackets 55 secured by cap screws 56 on the head of the engine. The air inlet chamber 48 is connected through a passageway 57 with a conduit 58 which leads to a port 59. The port 59 is formed through the skirt of the engine cylinder 52 and is positioned so that the skirt 36 of the piston will not cover the port at any time. Thus, on the down-stroke of the piston air may be forced into the conduit 58 and upwardly through the passageway 57 and the chamber 48 into the firing space of the engine cylinder. The chamber 48' is formed with a port 57' in its side wall which communicates directly with the atmosphere. It will thus be seen that in addition to supplying the firing space of the cylinder with air drawn into the cylinder through port 57' by suction of the piston that air will also be introduced into the cylinder under pressure from the crank-case through the pipe 58 and the passageway 57.

Formed through the walls of the cylinder upon diametrically opposite sides thereof are ports 60. These ports are so positioned as to insure that when the piston is at the end of its compression stroke the skirt 36 will uncover the port 60, and that when the piston is at the end of its firing stroke the piston head will uncover the ports 60 so that the exhaust gases may pass from the combustion space within the cylinder. Mounted over the ports and in communication therewith are exhaust stacks 61. These are funnel-shaped and extend upwardly and outwardly and conduct the exhaust gases away from the cylinder. Extending downwardly from each of the stacks is a tubular portion 62 which communicates with the stack and provides a conduit through which air may be drawn into the cylinder beneath the piston when the piston is at the top of its stroke.

In operation of the present invention it is to be understood that the engine is assembled as shown in the drawings, and that since the lower head or base 39 seals the lower end of the cylinder a compression space 63 will occur between the piston and the member 39, and that furthermore the tubular bearing 38 will cooperate with the piston sleeve 27 to produce a seal, so that on the up-stroke of the piston air will be drawn by suction into the space 63 through the ports 60, and on the down-stroke this air will be compressed to be forced outwardly through the port 59 and then through the conduit 58 to the chamber 48. During the down-stroke of the piston and while air is being compressed within the compression space 63 the valves 49 and 49' are closed. This permits compression of the air in space 63 before it is released into the cylinder. As the piston moves downwardly and after its upper end has passed exhaust ports 60 the valve 49 will open to release the compressed air from the compression space 63 into the cylinder, and valve 49' will open to allow air to pass into the cylinder through the port 57. The valves 49 and 49' will then close so that the air may be compressed within the cylinder as fuel is injected through the injector nozzle 47. When a degree of compression has been reached sufficient to cause the atomized fuel to flash the explosive charge will be ignited and the piston will begin its down-stroke. During this time the valves 49 and 49' are closed. It will be understood that as the piston uncovers the exhaust ports 60 the cylinder will be scavenged so that the burner gases which are under pressure will pass outwardly through the stacks 61. These will tend to create suction in the tube 62 to draw air into the stacks so that the burned gases will be dissipated, and so that the stacks will contain fresh air which is then drawn into the compression space 63. It will be recognized that prior to the time the skirt 36 of the piston reaches a point in its upward travel where it will uncover the ports 60 that the valves 49 and 49' are closed so that a partial vacuum will be created within the space 63 of the cylinder. Thus, when the skirt of the piston uncovers the ports 60 air will rush into the space 63 to fill the void and a sufficient quantity of air will thus flow into the space 63 so that on the down-stroke of the piston this air may be compressed. Attention is also directed to the fact that the inflow of fresh air will tend to cool the cylinder wall as well as the piston and its sleeve. This insures that the engine will operate at a relatively low temperature, and that it may not require the use of water cooling jackets.

By the arrangement here disclosed it will also be evident that crank case compression is eliminated in a two-cycle type of engine, and that the construction whereby the piston sleeve 27 telescopes within the tubular bearing 38 makes it possible for a large compression space 63 to be obtained, while at the same time providing a bearing surface which will stabilize the piston in its reciprocation.

It will thus be seen that the structure here disclosed provides an engine of simple design which operates on the Diesel principle, and is of the two-cycle type, and which engine insures that adequate air will be provided to support combustion within the firing chamber, and that the engine may be maintained cool during this operation.

While I have shown the preferred form of the invention, it is to be understood that various changes may be made in the combination, construction and arrangement of the parts of the apparatus by those skilled in the art without departing from the spirit of the invention as claimed.

Having thus described my invention, what I claim and desire to secure by Letters Patent is:

1. In a Diesel engine, the combination with a cylinder, a piston therein, a crank casing, a crank journaled in the crank case and having a cylindrical T-head, a piston projection having transverse bearing holes in which the ends of the T-head are journaled, a separate bearing part to make it possible to assemble the T-head connection rod, and a tubular sleeve with an inside shoulder to hold the bearing together with a flange to hold the sleeve to the piston with binding screws.

2. In a Diesel engine the combination with a cylinder, a piston therein, said piston having a short skirt and having a central longitudinal projection, a connection rod having a T-head located within said projection and a bearing in which said T-head is journaled, a cylindrical sleeve with an inside shoulder and a flange held in place by binding screws.

3. In a Diesel engine the combination of a cylinder, an annular base plate at the bottom of the cylinder having a central cylindrical boss, a piston in the cylinder and having a cylindrical projection slidably fitted in said boss, the space between the piston and the base plate constituting a cavity for air which is taken in through the exhaust ports when the piston is up and a passage for the air to pass to the upper portion of the cylinder when the piston is down.

4. In a Diesel engine the combination of a cylinder, a crank casing means to connect the crank casing to the cylinder, an annular base plate secured in the lower end of the cylinder at the place of connection between the casing and the cylinder, said plate having a central hollow cylindrical boss, an angular clearing in said boss to give clearance for the connection rod when it makes its oscillation, a piston in the cylinder and having a cylindrical projecting sleeve fitted as a piston in said boss, said piston having a short skirt to uncover the exhaust port and sealing said port when the piston is down, and an exhaust pipe having a port on the side to admit fresh air to the exhaust ports, a passage to the intake valve whereby the air trapped within the lower end of the cylinder and compressed by the piston on its down-stroke will be delivered into the cylinder above the piston.

5. An internal combustion engine, comprising an engine cylinder, a crank case upon which it is mounted, a crank shaft within the case, a partition head between the crank case and the cylinder, a tubular sleeve reciprocating through a central opening in said head, a piston carried at the upper end of said sleeve, a rod connecting the crank shaft and the piston, a cylinder head on the upper end of the cylinder, an air inlet passageway therethrough establishing communication between the atmosphere and the cylinder, a second air inlet passageway communicating with the space within the cylinder below the piston, valves controlling each of said inlets, means for introducing fuel to the head of the cylinder for combustion therein, an exhaust port within the cylinder wall adapted to be uncovered at the end of the power stroke, an exhaust stack communicating with said port and directing the burned gases outwardly and away from the cylinder, and an air tube communicating with the exhaust stack at a point intermediate the ends thereof, whereby air will be drawn into the exhaust stack.

6. An internal combustion engine of the Diesel type, comprising a cylinder, a crank case upon which said cylinder is mounted, a crank shaft within the case, a partition head between the crank shaft and the cylinder, a firing head at the opposite end of the cylinder, a piston reciprocably mounted within the cylinder, a tubular guide formed as a part of said partition head, a tubular sleeve connected to the piston and extending through said guide and having a sliding fit therewith, a connecting rod attached to the crank shaft and extending upwardly through the tubular guide and the piston sleeve and pivotally connected to the piston, means for injecting fuel into the firing space of the cylinder, a port through which communication is established between the atmosphere and the firing space of the cylinder, a valve operating in synchronism with the crank shaft for opening and closing said port, a second port communicating with the firing space of the cylinder, a conduit connected therewith leading to a compression space formed between the partition head and the piston, a valve operating in synchronism with the crank shaft for opening and closing said last named port, an exhaust port through the side wall of the cylinder adapted to be uncovered to permit the outflow of burned gases from the cylinder at the end of the power stroke, a tubular stack in communication with said exhaust port directed outwardly and upwardly and through which the exhaust gases flow, and an air opening through the lower side of the wall of said stack adjacent to the induction end thereof whereby air may pass into the stack and may be drawn into the cylinder while the exhaust port is uncovered.

ENOCK NORRBOM.